United States Patent [19]

Bain

[11] Patent Number: 5,223,293
[45] Date of Patent: Jun. 29, 1993

[54] PROCESS FOR TREATING DEEP-FROZEN VEGETABLES

[75] Inventor: Jacques Bain, Mont-Saint-Aignan, France

[73] Assignee: Societe de developpement de l'industrie agro-alimentaire et de la pepiniere europeenne - SODIAPE, France

[21] Appl. No.: 741,640

[22] Filed: Aug. 7, 1991

[30] Foreign Application Priority Data

Aug. 8, 1990 [FR] France .................... 90 10127

[51] Int. Cl.$^5$ .............................. A23B 7/00
[52] U.S. Cl. .................... 426/305; 426/307; 426/393; 426/524
[58] Field of Search ............ 426/302, 305, 307, 524, 426/393

[56] References Cited

U.S. PATENT DOCUMENTS 3,607,313 9/1971 Roth .................... 426/302
3,868,470 2/1975 Fallon et al. .................... 426/302
4,478,861 10/1984 Montgomery et al. .................... 426/524

FOREIGN PATENT DOCUMENTS 2267053 11/1975 France .
2628943 9/1989 France .................... 426/305
55-85361 6/1980 Japan .
58-863 1/1983 Japan .
58-78549 5/1983 Japan .

Primary Examiner—George Yeung
Attorney, Agent, or Firm—Hill, Steadman & Simpson

[57] ABSTRACT

The process for treating deep-frozen vegetable foodstuffs, comprising the following steps in succession:
preparation and deep-freezing of the vegetable matter;
coating of the pieces of vegetable matter with a coating composition without water which is essentially composed of one or more vegetable fatty substance(s),
chilling of the pieces of vegetable matter which have thus been coated to bring the coating composition into a solid and sufficiently hard state;
packaging and storage of the pieces of vegetable matter which have thus been coated and deep-frozen.

24 Claims, 1 Drawing Sheet

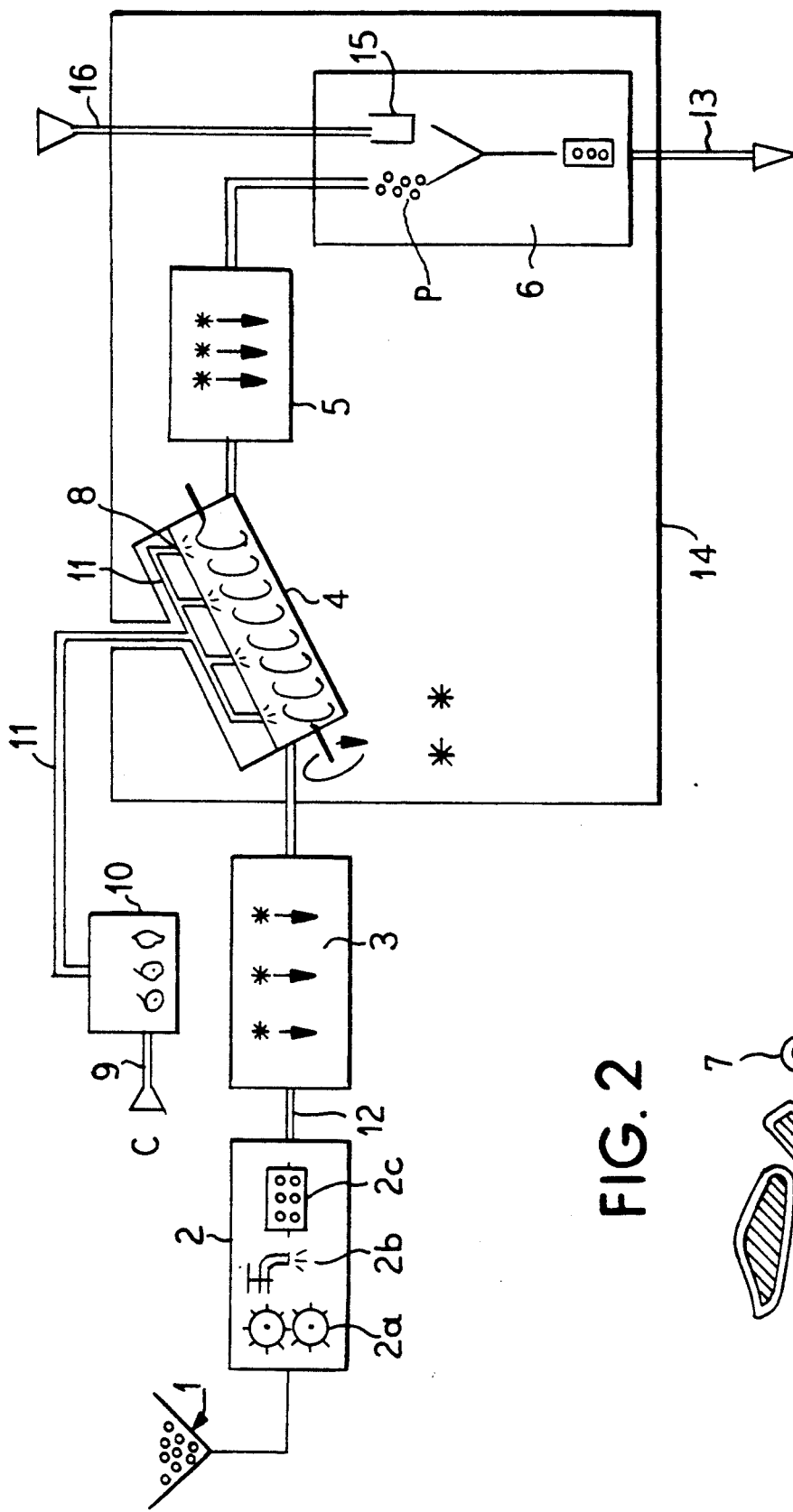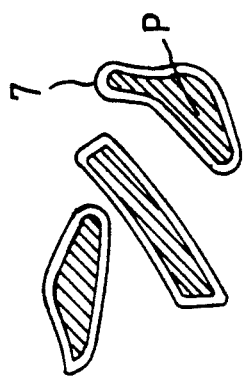

PROCESS FOR TREATING DEEP-FROZEN VEGETABLES

FIELD OF THE INVENTION

The invention relates to a process and an installation for treating deep-frozen products.

PRIOR ART

The method of treating deep-frozen food products is already known. Reference may be made, for example, to the following documents: FR-A-2,267,053, which describes a deep-frozen food product coated with a coating made of batter; JP-A-58,078,549, according to which the treatment consists of immersing the deep-frozen food product in an emulsion based on batter and on cereals.

However, in the case of deep-frozen food products which are accompanied by a sauce, the earlier techniques present certain problems, or have certain limitations. Thus, in practice, when the sauce is simply introduced into the packaging which contains the deep-frozen foodstuffs, it freezes as a whole, giving an appearance to the product which makes it unattractive to the consumer.

To remedy this shortcoming, there have been proposed processes for treating deep-frozen products comprising an I.Q.F.-type deep-freezing step and a step in which the deep-frozen products are coated with a composition based on chocolate (JP-A-5,585,361), or on a flavored sauce containing water (U.S. Pat. No. 3,607,313 and JP-A-5,800,863).

Nevertheless, besides the fact that the organoleptic qualities of products treated in this manner are affected, the food products which have been deep-frozen by the known method are generally used all at once or else divided into individual doses. In the deep-frozen state, these products mostly come in the form of compact blocks which are used as such, which is not a disadvantage. Accordingly, the known method cannot be adapted, or can be adapted only with difficulty, to those cases where, in contrast, the deep-frozen food products are intended to be used in the form of non-separate fractions as such (in the manner of doses). This is the case (for example) with deep-frozen aromatic herbs which are offered for sale in packs containing from 20 g to 1,000 g each, the herbs then being used by way of small fractions (pinches or teaspoonfuls). In fact, in such an example, it is essential that the deep-frozen products do not form compact blocks which cannot be divided into fractions. Experience has shown that in the case of this type of products, there is a considerable risk of setting solid because of syneresis and supercooling of the water. For example, when there is an accidental interruption of the cold chain, the water recrystallizes when the product is refrozen.

SUMMARY OF THE INVENTION

Accordingly, it is the aim of the invention to provide a method (process and installation) of treating deep-frozen products in pieces with a view to avoiding setting solid of the latter.

In particular, it is an aim of the invention to provide a method (process and installation) for treating deep-frozen products in small-sized pieces with a view to avoiding setting solid of the latter.

It is another aim of the invention to provide food products obtained by this method.

It is another aim of the invention to provide deep-frozen food products, in pieces, which can be used in the form of fractions taken from a larger quantity of deep-frozen products, while the latter remain in the deep-frozen state.

It is another aim of the invention to provide deep-frozen food products in pieces which remain separate even when the cold chain is interrupted.

To this end, the invention proposes, firstly, a process for treating a deep-frozen product in pieces which, after the deep-freezing step and when the product is, or is kept, substantially in the deep-frozen state, comprises a step in which the pieces are substantially coated with a coating composition without water which consists of at least one type of fat. According to the embodiment under consideration, the product in question is a food product, in particular of plant origin. The coating composition itself is therefore of food quality and is edible. It does not substantially affect the organoleptic qualities of the treated product. This coating composition is therefore essentially of vegetable origin, in particular without water, and essentially made up of in the region of 80% by weight of sunflower oil and in the region of 20% by weight of palm oil. A coating composition is used in the process where the component(s), proportion, quantity and temperature are selected depending on the product to be treated in such a way that the composition can be brought to the liquid state at the coating temperature and deposited on the pieces of the product in this state so as to form a coating film; is in the solid state and sufficiently hard at all temperatures below around 0° C. and therefore during packaging, and has a melting point in the region of room temperature. The ratio by weight of coating composition to the product to be treated is between around 3% to 5%.

In the embodiment under consideration, the process comprises the following sequence of steps:

a step in which the pieces are substantially coated with a coating composition without water and comprising mainly fat, which step consists of spraying the hot coating composition in the liquid state onto the pieces of the product to be treated, while shaking;

a subsequent step in which the pieces thus coated are cooled until the coating composition without water is brought into the solid state and sufficiently hard;

a final subsequent step of packaging the pieces of the product which have been coated and deep-frozen in this way.

The invention also relates to deep-frozen food plants such as aromatic herbs or vegetables, in the form of pieces, which are provided on and around the pieces with a coating of a composition without water which is essentially composed of one or more vegetable fats which are in the solid state and sufficiently hard at all temperatures below around 0°·C., the ratio by weight of coating composition to vegetable material being between around 3% to 5%.

The invention also relates to an installation for treating deep-frozen products, which comprises, in the downstream direction:

a deep-freezing device;

a coating device such as a turbine which receives the deep-frozen products and is provided with spray nozzles which are joined via connection ducts to a heating apparatus which receives a supply of coating composition.

According to other features, this installation moreover comprises a chilling device arranged between the turbine and the packaging machine. The turbine and the chilling device are located in a low-temperature enclosure.

BRIEF DESCRIPTION OF THE DRAWINGS

These aims and many others, as well as the advantages, characteristics and variants of the invention, will emerge from the following description of a variety of embodiments, without imposing any restriction, as well as the two appended drawings, namely:

FIG. 1, which is a functional block diagram which illustrates the process according to the invention as well as an installation for putting it into effect.

FIG. 2, which is a diagram of a section through the deep-frozen product which has been treated according to the invention.

DESCRIPTION OF THE PREFERRED EMBODIMENT

The invention relates to the treatment of deep-frozen products P which are in the form of pieces. In the embodiment under consideration, which is described in detail, the products P are food plants such as aromatic herbs (thyme, parsley, etc.) or vegetables (onions, etc.). The pieces under consideration originate in a cutting, shredding or trimming process or another preparation process of the same type (aromatic herbs), or from the structural unit of the product itself (onion). The pieces of product P can have a size of the order of a millimeter or less up to the order of a centimeter or more. These pieces can have an overall shape which is thread-like, ribbon-like or strip-like, or which is solid, for example spherical or other.

The process comprises the following steps in succession, put into effect by means of a suitable installation:

a) A step in which the vegetable matter P, which originates from a supply of vegetable matter 1 (hopper, trough, conveyor belt, etc.) is prepared. This step employs one or more devices 2 which can include means for cutting, shredding or trimming 2a, means for washing 2b and means for spin-drying 2c. These means 2a, 2b and 2c operate, for example continuously.

b) A step in which the vegetable material which has thus been prepared is deep-frozen, for example by means of a deep-freezing tunnel 3 which operates continuously.

c) A step in which the pieces of vegetable matter P are coated with a coating composition C without water and which comprises at least one, in particular comprises mainly, and—in a variant—is composed essentially of at least one, or a mixture or association of a plurality of, fatty substances. This step can be effected as will be seen by means of a turbine 4 of the pill-coating turbine type, which are well known per se in agricultural food production industry.

d) Advantageously, a step in which the pieces of vegetable matter P which have thus been coated are cooled to bring the coating composition C without water into a solid and sufficiently hard state. This step can be effected by means of a chilling tunnel 5.

e) A final subsequent step in which the pieces of vegetable matter P which have been coated and deep-frozen in this way are packaged by means of a suitable packaging machine 6.

A coating composition is used in which the component(s), proportion, quantity and temperature are selected depending on the product to be treated in such a way that the composition can be brought to the liquid state at the coating temperature and deposited on the pieces of the product in this state so as to form a coating film; is in the solid state and sufficiently hard at all temperatures below around 0° C. and therefore during packaging, and has a melting point in the region of the ambient temperature.

Thus, the coating composition used in the embodiment under consideration is a mixture of fatty substances which comprises mainly sunflower oil in a proportion by weight of at least 50%; or a mixture of sunflower oil and palm oil, in particular in the region of 70% to 90% by weight of sunflower oil and in the region of 10% to 30% by weight of palm oil. Thus, the coating composition C without water which is used in the described embodiment under consideration, is a vegetable substance, or a mixture of vegetable substances. In particular, the coating composition is essentially composed of in the region of 80% by weight of sunflower oil and in the region of 20% by weight of palm oil. In a variant, the fatty substance(s) is (are) of animal origin.

The coating temperature—that is to say the temperature at which the coating composition is deposited on the pieces of vegetable matter P to give a film 7 of this composition C on and around them—is in the region of from 85° C. to 100° C. The melting point of the coating composition C is in the region of 20° C.

The proportion by weight of coating composition to treated product and thus including the composition C, is between around 3% to 5%.

The step in which the pieces of vegetable matter P are coated is carried out while the latter are, or are kept, substantially in the deep-frozen state, at a temperature in the region of $-18°$ C. or less. This coating substantially applies to the entire external surface of the pieces of vegetable matter P in such a way that the pieces are completely, or almost completely, enclosed in the protective film 7 which surrounds them.

The coating step proper consists of spraying the coating composition, which has been heated to the liquid state (or sufficiently liquid state), under pressure onto the pieces of vegetable matter P which are shaken in a suitable fashion. This spraying step is carried out mechanically through a spraying nozzle or nozzles 8 connected to a supply 9 of composition C under pressure via a heating apparatus 10 and suitable connecting ducts 11.

In the embodiment under consideration, the coating step is carried out continuously, as are the other steps. According to another possible embodiment, the coating step is carried out discontinuously with batches of product P.

The installation for putting into effect the process comprises conveyors 12 which form a continuous line from upstream where there is the supply 1 of vegetable matter to downstream which is the outlet 13 of the machine 6. On this line there are arranged, in a downstream direction, the device(s) 2a, 2b, 2c, the deep-freezing tunnel 3, the turbine 4 or an equivalent, the chilling tunnel 5 and the packaging machine 6.

However, the process and installation can also comprise, in each case, complementary steps or means such as grinding or others. The packaging (and machine 6) can also comprise complementary steps or means such as bagging, bundling, gathering, placing on pallets, overwrapping and storing.

In the embodiment under consideration, the turbine 4, the tunnel 5 and the packaging machine 6 (as well as the optional complementary means which have been mentioned above) are located in a low-temperature enclosure 14 which is suitable for maintaining the vegetable material P in the deep-frozen state during the treatment.

Such an enclosure 14, such as a refrigerated enclosure, comprises passages for the materials or foodstuffs to be used, namely, besides the vegetable matter P, the composition C and the packs 15 which are intended for machine 6. These packs 15 (already shaped or to be shaped) arrive at the machine by means of a supply of packs 16. As far as the connection ducts 11 are concerned, and if the composition C arrives at the turbine 4 in the hot state, a suitable insulation is provided.

The deep-freezing tunnel 3 is a standard type and operates according to the I.Q.F. (individual quick freezing) method.

The installation also comprises the control, measuring and checking means which are customary for this type of installation. These latter may include a programmable robot or robots, which are programmed according to a plurality of operating sequences or cycles which are adapted in each case to the vegetable matter P.

The process and installation can also be used with a plurality of items of vegetable matter P, which are treated simultaneously and mixed.

The invention also relates to deep-frozen products such as are obtained by putting into effect the process or the installation. In the embodiment under consideration, these products are aromatic herbs or vegetables, as has already been mentioned. Such pieces of vegetable matter comprise on and around them a coating without water of a composition which is essentially composed of one or more fatty substances of vegetable origin which are in the solid state and sufficiently hard at all temperatures around 0° C. and less, the proportion by weight of coating composition in relation to coated vegetable matter being between around 3% to 5%. The amount of composition C relative to that of vegetable matter P is determined as has already been mentioned in such a way that the composition C, which forms the film 7, can exert its function which consists of preventing, or slowing down, setting solid of the frozen vegetable matter as a result of, in particular, temperature variations of the vegetable matter P during storage, which can be, and is, long-lasting in most cases.

Although the present invention has been described with reference to a specific embodiment, those of skill in the art will recognize that changes may be made thereto without departing from the scope and spirit of the invention as set forth in the appended claims.

I claim:

1. A process for treating deep-frozen pieces of vegetable matter, said process comprising the following steps in succession:
    preparing and rapid individual deep-freezing of the vegetable matter; maintaining of a deep-frozen state during all subsequent steps;
    coating of the deep-frozen pieces of vegetable matter with a coating composition without water which is of food quality, is edible, and is essentially composed of a vegetable fatty substance, or a mixture of several vegetable fatty substances, selected so that the coating composition is in the solid state at a temperature of less than approximately 0° C. and has a melting point at approximately room temperature;
    chilling the pieces of vegetable matter thus coated so as to bring the coating composition into the solid state; and
    packaging and storing the pieces of vegetable matter which have thus been coated and deep-frozen.

2. The process as claimed in claim 1, wherein the coating composition used is a mixture of fatty substances which comprise mainly sunflower oil in a proportion by weight of at least 50%.

3. The process as claimed in claim 1, wherein the coating composition used is a mixture of fatty substances comprising sunflower oil and palm oil.

4. The process as claimed in claim 3, wherein the coating composition used is a mixture of fatty substances comprising from around 70% to 90% by weight of sunflower oil and from around 10% to 30% by weight of palm oil.

5. The process as claimed in claim 4, wherein the coating composition used is essentially composed of around 80% by weight of sunflower oil and around 20% by weight of palm oil.

6. The process as claimed in claim 1, wherein the temperature of the coating composition during the coating step is selected from approximately 85° C. to approximately 100° C.

7. The process as claimed in claim 1, wherein the melting point of the coating composition is around 20° C.

8. The process as claimed in claim 1, wherein the proportion by weight of coating composition to pieces of vegetable matter treated is between around 3% and 5%.

9. The process as claimed in claim 1, wherein, to coat the pieces of vegetable matter with the coating composition, the coating composition which is hot and in the liquid state is sprayed onto the pieces of vegetable matter to be treated, with shaking.

10. The process as claimed in claim 9, wherein the spraying process in the coating step is carried out continuously.

11. The process as claimed in claim 9, wherein the spraying process of the coating step is carried out discontinuously, batchwise.

12. The process as claimed in claim 1, wherein the vegetable matter consists essentially of aromatic herbs.

13. A process for treating deep-frozen vegetables comprising the following steps in succession:
    deep freezing individual pieces of vegetable matter;
    maintaining of a deep frozen state during all subsequent steps;
    coating of the vegetable matter with a coating composition consisting essentially of a water free vegetable fatty substance, selected having a temperature of solidification less than approximately 0° C. and a temperature of melting at approximately room temperature;
    chilling the pieces of vegetable matter thus coated so as to bring the coating composition into the solid state; and
    packaging and storing the pieces of vegetable matter which have thus been coated and deep frozen.

14. The process as claimed in claim 13, wherein the coating composition used is a mixture of fatty substances which comprise mainly sunflower oil in a proportion by weight of at least 50%.

15. The process as claimed in claim 13, wherein the coating composition used is a mixture of fatty substances comprising sunflower oil and palm oil.

16. The process as claimed in claim 15, wherein the coating composition used is a mixture of fatty substances comprising approximately 70% to 90% by weight of sunflower oil and approximately 10% to 30% by weight of palm oil.

17. The process as claimed in claim 16, wherein the coating composition used is essentially composed of around 80% by weight of sunflower oil and around 20% by weight of palm oil.

18. The process as claimed in claim 13, wherein the temperature of the coating composition during the coating step is selected from approximately 85° C. to approximately 100° C.

19. The process as claimed in claim 13, wherein the melting point of the coating composition is approximately 20° C.

20. The process as claimed in claim 13, wherein the proportion by weight of coating composition to pieces of vegetable matter treated is between approximately 3% and 5%.

21. The process as claimed in claim 13, wherein, to coat the pieces of vegetable matter with the coating composition, the coating composition which is hot and in the liquid state is sprayed onto the pieces of vegetable matter to be treated, with shaking.

22. The process as claimed in claim 21, wherein the spraying process in the coating step is carried out continuously.

23. The process as claimed in claim 21, wherein the spraying process of the coating step is carried out discontinuously, batchwise.

24. The process as claimed in claim 13, wherein the vegetable matter consists essentially of aromatic herbs.

* * * * *